United States Patent [19]
Baxter

[11] Patent Number: 5,029,015
[45] Date of Patent: Jul. 2, 1991

[54] VIDEO SIGNAL RECORDER/PLAYER DEVICES

[75] Inventor: Thomas Baxter, Westerham, England

[73] Assignee: U.S. Philips Corporation, New York, N.Y.

[21] Appl. No.: 299,706

[22] Filed: Jan. 23, 1989

[30] Foreign Application Priority Data

Jan. 22, 1988 [GB] United Kingdom ............... 8801442
Apr. 18, 1988 [GB] United Kingdom ............... 8809088

[51] Int. Cl.$^5$ .............................................. H04N 5/76
[52] U.S. Cl. ................................ 358/335; 358/191.1; 358/310; 360/33.1; 455/186; 455/184; 455/166
[58] Field of Search ............... 455/226, 186, 234, 295, 455/188, 184, 166; 358/188, 310, 315, 335, 192.1, 193.1, 191.1

[56] References Cited

U.S. PATENT DOCUMENTS 2,897,351  6/1959  Melton ................................. 455/226
4,789,905 12/1988  Ezaki ................................... 358/335
4,833,728  6/1989  Kimura et al. ....................... 455/166

FOREIGN PATENT DOCUMENTS 2034995  6/1980  United Kingdom ............... 455/186

Primary Examiner—Roy N. Envall, Jr.
Assistant Examiner—Thai Tran
Attorney, Agent, or Firm—Edward W. Goodman

[57] ABSTRACT

A video signal recorder/player device, e.g. a video tape recorder, is adapted to select a playback channel to be any one of a plurality of UHF television channels. A microcontroller in the device sets a UHF tuner in the device to each UHF channel in turn and tests the signal level in the channel. A free channel containing substantially no signals is selected, when found, as the playback channel, only when the immediately adjacent lower channel does not contain a wanted broadcast television transmission. Once a selection is made, the microcontroller sets the playback channel frequency to that of the selected channel.

8 Claims, 3 Drawing Sheets

VIDEO SIGNAL RECORDER/PLAYER DEVICES

BACKGROUND OF THE INVENTION

1. Field of the Invention

This invention relates to video signal recorder/player devices which are operable to produce video signals (with or without accompanying audio signals) from recorded information, and which are further operable to modulate a carrier signal with these video/audio signals for transporting them to a television receiver in an information channel which is provided in a suitable transmission medium, the information channel having a given bandwidth with respect to the frequency of the carrier signal.

2. Description of Related Art

In the case of a domestic video tape recorder/player device, for which the information channel is commonly known as a "playback channel" and will be so termed hereinafter, the recorder part is tunable selectively to any one of a plurality of UHF television channels to receive and to record onto tape television transmissions transported in these channels.

The UHF television channel allocation for Bands IV and V in the United Kingdom covers 44 channels which are numbered 21 to 34 and 39 to 68, the carrier frequency for adjacent channels being 8 MHz apart. Details of this channel allocation is given in IBA Technical Review No. 10, May 1978, and therefore will not be considered further in the present specification. A similar though possibly extended frequency allocation is used for these bands in Continental Europe.

The playback channel used for a domestic video tape recorder/player device is notionally a particular one of these 44 UHF television channels which has not been allocated to a terrestrial broadcast television station. However, there is often interference present in the playback channel from a broadcast channel transporting a television transmission, depending on where the device is located. There is a facility on many video tape recorder/player devices for making a manual adjustment to the frequency of the carrier signal which defines the playback channel to move the channel relative to an interfering broadcast channel, but this is not always successful in reducing the interference. The interference from broadcast channels has been found to be particularly bad in certain European locations where television transmissions from several different transmitters can be received.

It is known from Japanese Applications Nos. 53-81786 and 59-263429 to provide a video tape recorder in which available television channels are tested for detecting the presence or absence of television transmissions and to use a vacant channel which is found as the playback channel for the video tape recorder. However, as will be considered later in the specification, this relatively simple method of selecting a playback channel has only a limited success in overcoming inter-channel interference in the various transmission and reception requirements which are imposed on present day domestic video tape recorder/player devices.

SUMMARY OF THE INVENTION

It is an object of the present invention to provide a video tape recorder/player device in which the problem of inter-channel interference is mitigated in a more advantageous manner.

According to the present invention, a video signal recorder/player device in which a channel testing and selection procedure identifies a vacant UHF television channel for use as a playback channel for the device, is characterized by including test means for determining the signal levels present in UHF television channels to which the device can be tuned, and selection means for selecting for use as a playback channel for the device, a channel in respect of which the signal level therein is less than a first predetermined level which signifies an acceptably interference free channel, and the signal level in the immediately adjacent lower channel is less than a second predetermined level, higher than the first, which signifies the use of this adjacent channel as a broadcast channel.

By testing the actual signal levels in the channels rather than simply testing for a vacant channel as identified by the absence of a broadcast television transmission therein, the whole frequency spectrum is investigated over the range of channels from which a selection of a channel for use as the playback channel is made. Because of this investigation, the present invention affords considerable advantage over the acknowledged prior art in two respects. Firstly, it results in the rejection as a playback channel of any channel which has an unacceptably high interference signal present in it, and not simply the rejection of a channel containing a broadcast television transmission. Such an interference signal may be, for example, an airport radar signal. Secondly, it also results in the rejection as a playback channel of any channel when the immediately adjacent lower channel contains a broadcast television transmission. This latter channel rejection result prevents the interference of such a broadcast television transmission, as received at the aerial input of the video signal recorder/player device, by the modulated carrier signal which is transported in the playback channel of the device. Such interference will occur for example when as is common practice in the interests of economy, the modulator output signal from a video tape recorder/player device is a double sideband signal which has its upper sideband occupying the playback channel and its lower (unwanted) sideband occupying the immediately adjacent lower channel.

In carrying the invention into effect as applied to a video tape recorder/player device, the signal levels may be determined by measuring the magnitude of a control voltage which is already produced in the device as a measure of the input signal strength to provide automatic gain control of an input amplifier stage.

By the use of the invention, it is highly probable that a playback channel can be selected which is substantially free from interference from any broadcast channel, and furthermore will not itself cause interference with reception from a broadcast channel.

In carrying out the invention, the test means may be arranged to determine the signal levels either in the complete range of UHF television channels to which the device can be tuned, or in only a smaller range of channels in which notionally "free" channels are available for selection as the playback channel in the sense that they are not allocated for use as broadcast channels which serve a territorial location where the device is to be used. In the latter case, the testing would not need to cover such a large range of possible signal levels.

The testing of the signal levels, and the subsequent selection and setting of the playback channel need only be carried out on setting-up of the device at a particular territorial location. Alternatively, the testing of the signal levels, and the subsequent selection and setting of the playback channel may be carried out periodically, for instance at set time intervals. In this case, it would be possible to change the channel which is being used as the playback channel. Such a change may also be initiated by a viewer when interference occurs in a previously interference-free playback channel. A further alternative is for the testing of the signal levels, and the subsequent selection and setting of a channel as the playback channel, to be carried out each time the playback channel is to be taken into use. Suitable control means would be provided for the control of these various operations. Of course, a television receiver to which the device is connected would need to be retuned to the new playback channel.

The test means and selection means can be implemented as a microcontroller and associated memory, a channel frequency selector, a tuner including a local oscillator, and a signal level detector, said microcontroller being programmed according to a signal level test and select algorithm which is initiated as required to cause the channel frequency selector to set the tuner to the carrier signal frequency of each of the channels to be tested, said signal level detector being operable to detect the level of the signal in the channel concerned and said microcontroller being responsive in accordance with the signal values as received by it from said signal level detector to allocate one of the tested channels as the playback channel.

In the case of a video tape recorder/player device, the microcontroller and associated memory, the channel frequency selector, and the tuner with the local oscillator may be those already provided in the device for its normal operation. The only additional means required for the test means and selection means is the signal level detector and additional software for the test and select algorithm.

Setting means for setting the carrier signal for the playback channel to the frequency defining the channel selected as the playback channel may be a digital-to-analog converter which, under the control of the microcontroller, sets a voltage-controlled oscillator that generates the carrier signals for the device to operate at the required frequency, said algorithm including the steps of programming the microcontroller for this control function.

BRIEF DESCRIPTION OF THE DRAWINGS

In order that the invention may be more fully understood, reference will now be made, by way of example, to the accompanying drawings, of which.

DESCRIPTION OF THE PREFERRED EMBODIMENT

Figure 1:
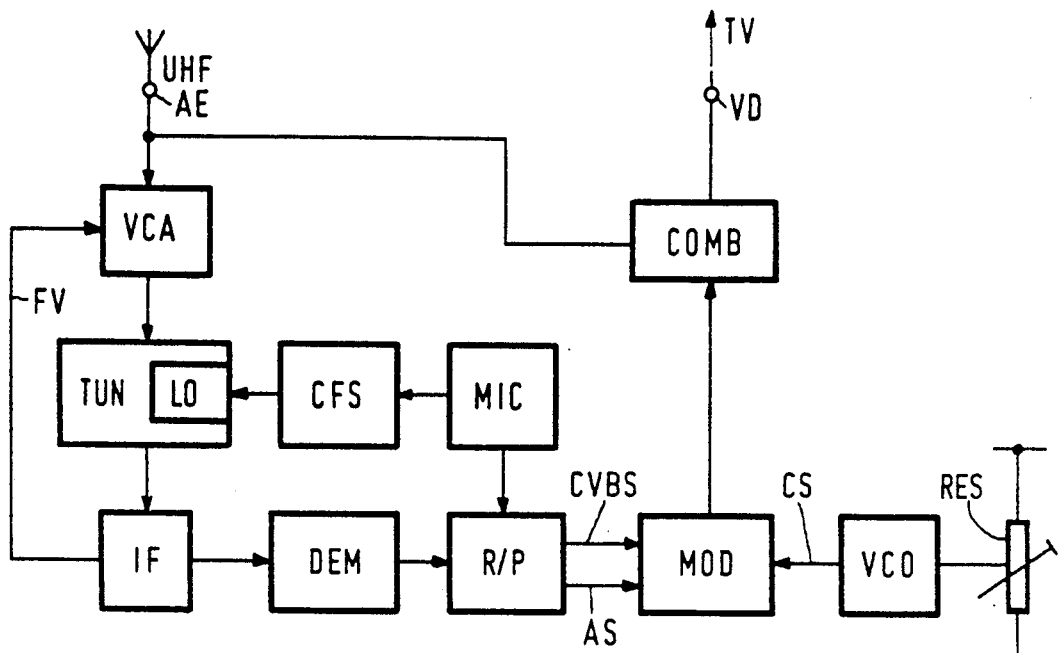
FIG. 1 is a block diagram of a conventional video tape recorder/player device.

Referring to the drawings, the conventional video tape player/recorder device represented by the block diagram in FIG. 1 has an aerial input terminal AE for receiving television signals which are broadcast in UHF television channels. This input terminal AE is connected through a combiner COMB to a video output terminal VD which is for connection to the aerial input terminal of a television receiver TV. The input terminal AE is also connected to the input of a voltage-controlled amplifier VCA the output of which is connected to the input of a tuner TUN with a local oscillator LO. A channel frequency selector CFS is operable to set the tuner TUN to the various UHF television channels under the control of a microcontroller MIC. The output of the tuner TUN is connected to the input of intermediate frequency stages IF. A feedback connection from the intermediate frequency stages IF to the amplifier VCA provides for automatic gain control of this amplifier by a feedback voltage FV. The output of the intermediate frequency stages IF is connected to the input of a demodulator DEM which retrieves the video baseband signal and an audio signal contained in the received television signal. These signals are then passed to a tape record/play element R/P for storage on a tape.

The video tape player/recorder device also comprises a modulator MOD and a voltage-controlled oscillator VCO. The oscillator VCO is preset to produce a carrier signal CS which defines the playback channel for the device. This playback channel is typically one of the UHF television channels 30 to 40 and can be preset within this number range, as signified by the resistance element RES. On playback from a recorded tape, a composite video baseband signal CVBS and an audio signal AS are applied from the element R/P to the modulator MOD which modulates the carrier signal CS with these signals. The resulting modulated signal is applied to the video output terminal VD via the combiner COMB. The signal CVBS contains the original video baseband signal together with synchronizing signals for the television receiver. The element R/P can also be adapted to supply the demodulator output signals directly to the modulator MOD without record and playback.

The channel selection and the recording and playback operations of the element R/P are controlled by the microcontroller MIC in accordance with control signals from a user interface (not shown).

Figure 2:
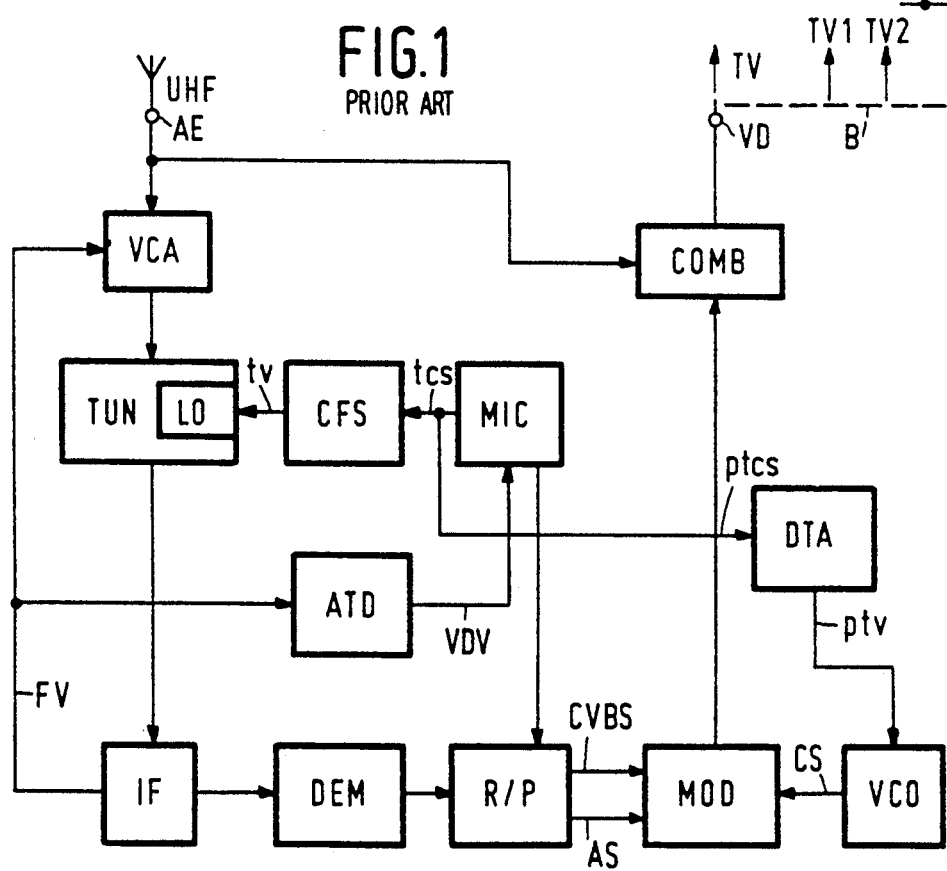
FIG. 2 is a block diagram of a video tape recorder/player device embodying the invention.

In a video tape player/recorder device embodying the invention as represented by the block diagram in FIG. 2, the elements which have counterparts in FIG. 1 have been given the same references as their counterparts. The device in FIG. 2 additionally comprises an analog-to-digital converter ATD, a digital-to-analog converter DTA which replaces the resistance element RES in the device of FIG. 1, and additional software for the microcontroller MIC.

The converter ATD is connected to receive the feedback voltage FV from the intermediate frequency stages IF and converts this voltage into a digital value VDV which is inputted to the microcontroller MIC. Because of the existing automatic gain control which is provided for over the feedback connection from the stages IF to the amplifier VCA, the magnitude of the feedback voltage FV is an accurate measure of the level of the received signal in the UHF television channel to which the tuner TUN is currently set.

The converter DTA is operable under the control of the microcontroller MIC to set the voltage-controlled oscillator VCO to produce a carrier signal the frequency of which defines as the playback channel any one of the UHF television channels to which the device can be tuned. The converters ATD and DTA may be the integrated circuit type PFC 8591 (Philips) which is controlled by the microcontroller MIC via a two-wire bi-directional I²C bus. This integrated circuit, together with additional software for the microcontroller MIC, are the only extra means required for the performance of the invention.

In order to select one of the UHF television channels as the playback channel, the microcontroller MIC is operable in accordance with a signal level test and select algorithm to apply successive digital channel tuning command signals tcs to the channel frequency selector CFS which is responsive to these command signals to apply to the tuner TUN successive tuning voltages tv which tune the local oscillator LO therein to the carrier frequency for each UHF television channel in turn. As each UHF television channel is tuned into, the feedback voltage FV is converted by the analog-to-digital converter ATD into the appropriate digital value VDV which is fed into the microcontroller MIC. The digital values VDV are used by the microcontroller MIC to select one of the tested UHF television channels as the playback channel. A digital command signal ptcs signifying the selected channel is produced by the microcontroller MIC and converted by the digital-to-analog converter DTA into a tuning voltage ptv which tunes the voltage-controlled oscillator VCO to the carrier frequency of the selected channel.

The programming of the microcontroller MIC in the performance of the invention may be such that the test, selection and setting sequence is carried out only on setting up of the device at a particular territorial location, or it is carried out periodically, or it is carried out each time the playback channel is to be taken into use. The selection of a UHF television channel as the playback channel may involve testing all of the UHF television channels; or may involve testing only a smaller range of channels.

Instead of using the feedback voltage FV, the determination of the signal levels in the UHF television channels can involve the actual signals which are received in the respective channels. This would require a signal level detector to which the received signals are applied and which is responsive to produce an analog voltage representing the signal level. This analog voltage would then be digitized in the same manner as the feedback voltage FV for application to the microcontroller MIC.

Figure 3:
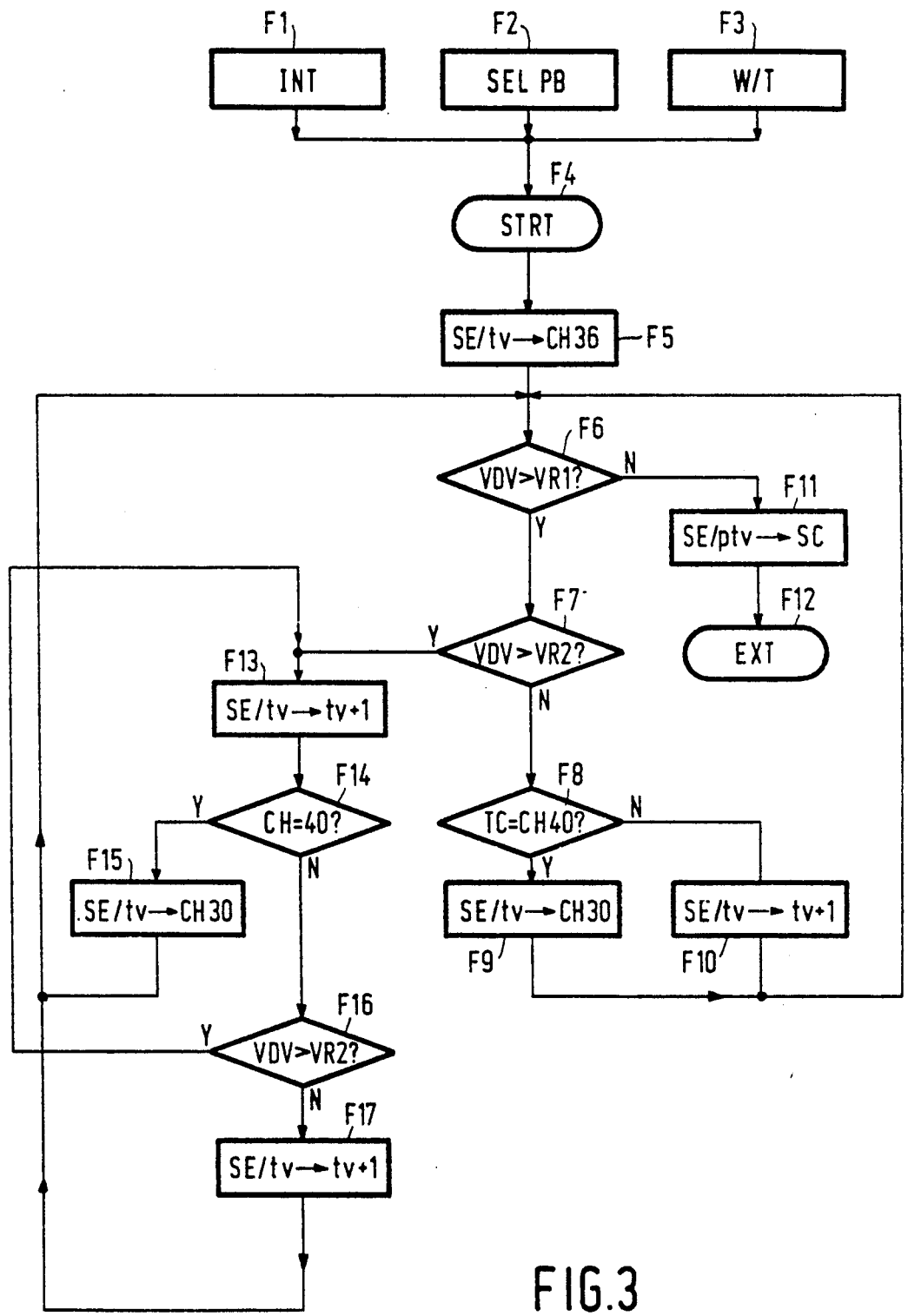
FIG. 3 shows a flow chart for the test and selection operations in the performance of the invention.
Figure 4A:
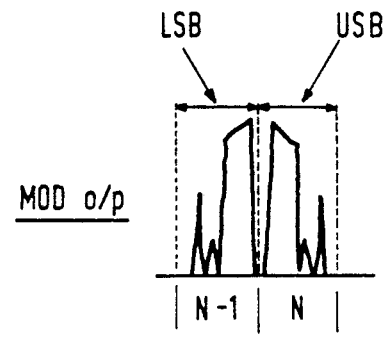
FIGS. 4 and 4a show diagrammatically a notional frequency spectrum for signals present in a range of UHF television channels.
Figure 4:
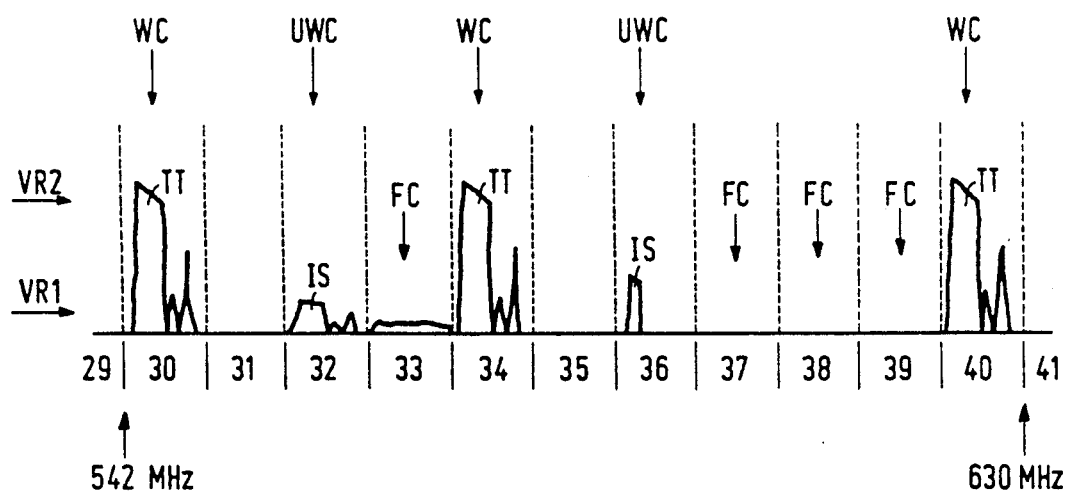

The flow chart shown in FIG. 3 and the UHF channels frequency spectrum shown in FIG. 4 will now be considered. In the flow chart, the legends in the various elements represent the following algorithm which is for selecting a playback channel in the UHF channel range 30–40.

| | |
|---|---|
| F1 (INT) - | Enter the algorithm to determine a playback channel on initialization or setting up of the device at a location. |
| F2 (SEL PB) - | Enter the algorithm to select a playback channel each time the device is taken into use. |
| F3 (W/T) - | Enter the algorithm under wait/timer control for the periodic determination of a playback channel. |
| F3 (STRT) - | This step signifies the start of the algorithm. |
| F5 (SE/tv → CH36) - | Set the local oscillator tuning voltage tv so that channel 36 is tuned to. |
| F6 (VDV > VR1?) - | Determine whether the resulting signal level VDV is greater than a first reference value VR1. |
| F7 (VDV > VR2?) - | This step is entered into when VDV > VR1. Reference to the channel frequency spectrum shown in FIG. 4 shows that this is the case in the example being considered because an interference signal IS is present in channel 36. However, VDV < VR2 so that step F8 is entered into from step F7. |
| F8 (TC = CH40?) - | This step determines whether or not the channel being tested is the last channel in the range. If it is, then step F9 is entered and if it is not step F10 is entered. |
| F9 (SE/tv → CH30) - | This step sets the tuning voltage tv so that channel 30 is tuned to and step F6 is entered again. |
| F10 (SE/tv → tv + 1) - | This step increments the tuning voltage tv so that the next channel (37) is tuned to and step F6 is entered again. |
| F11 (SE/ptv → SC) - | This step is now entered into from step F6 because VDV < VR1 for channel 37. This step sets the tuning voltage ptv to tune the oscillator VCO to channel 37 as the playback channel. |
| F12 (EXT) | The algorithm is exited following the selection of the playback channel. |
| F13 (SE/tv → tv + 1) - | This step is entered when in step F7 VDV > VR2 to signify that the channel being tested contains a wanted television transmission to increment the tuning voltage tv so that the next channel is tuned into. |
| F14 (CH = 40?) - | This step is entered into from step F13 to determine whether or not the next channel to which the tuning voltage tv pertains is channel 40. If it is, then step F15 is entered and if not step F16 is entered. |
| F15 (SE/tv → CH30) - | This step sets the tuning voltage tv so that channel 30 is tuned to and step F6 is entered again. |
| F16 (VDV > VR2?) - | This step determines whether or not the (next) channel tested contains a wanted television transmission. If it does (VDV > VR2) then step F13 is returned to increment the channel number and repeat the loop formed by steps F13 to F16. If it does not (VDV < VR2) then step F17 is entered. |
| F17 (SE/tv → tv + 1) - | This step also increments the channel number and in so doing 'skips' what might otherwise be a free channel except that the immediately adjacent lower channel contains a wanted television transmission. Step F6 is returned to from step F17. |

The channel frequency spectrum diagram shown in FIG. 4 covers the eleven successive UHF channels 30 to 40 inclusive which have 8 MHz channel spacing in the frequency range 542 MHz to 630 MHz. The channels 30, 34 and 40 are wanted channels WC because they contain wanted television transmissions TT having signal levels greater than VR2. The channels 32 and 36 are unwanted channels UWC because they contain interference signals IS having signal levels greater than VR1. Channels 31 and 35 are signal free but they cannot be selected as a playback channel because the immediately adjacent lower channel 30 or 34 is a wanted channel WC. The remaining channels 33, 37, 38 and 39 are free channels FC which are available for selection as the playback channel. The algorithm represented by the flow chart of FIG. 3 would reject channel 36 and select channel 37 as the playback channel. If channels 36 to 39 had signal interference levels greater than VR1 then channel 33 would be finally chosen as the playback channel.

The inset (a) of FIG. 4 shows the double sideband output MOD O/P of the modulator. The wanted upper sideband WB occupies the selected playback channel N and the unwanted lower sideband LSB occupies the immediately adjacent lower channel N-1. Because the invention never allows the playback channel to be chosen such that the unwanted lower sideband causes interference in a wanted immediately adjacent lower channel, it becomes possible to organize a video tape recorder/player device such that the video output terminal thereof (VD-FIG. 2) can be connected to a common bus B to which other television receivers TV1, TV2 can be connected to receive broadcast television transmissions in their respective channels via the combiner COMB of the same time as the television receiver TV is receiving the modulated signal from the modulator MOD in the playback channel.

A possible modification of the algorithm represented by the flow chart of FIG. 4 is to choose as the playback channel the channel containing an interference signal having the lowest level in a case where no free channel FC has a signal level less than VR1. This can readily be achieved after a number of test cycles by storing the signal levels from the several free channels FC and selecting the lowest signal level.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. he applicants hereby give notice that new claims may be formulated to such features and/or combinations of such features during the prosecution of the present application.

What is claimed is:

1. A video signal recorder/player device in which a channel testing and selection procedure identifies a vacant UHF television channel for use as a playback channel for the device, characterized in that said device comprises test means for determining the signal levels present in UHF television channels to which the device can be tuned, and selection means coupled to said test means for receiving said determined signal levels, said selection means selecting, for use as a playback channel for the device, a UHF channel in respect of which the signal level therein is less than a first predetermined level which signifies an acceptable interference free channel, and the signal level in the immediately adjacent lower UHF channel is less than a second predetermined level, higher than the first predetermined level, which signifies the use of this adjacent channel as a broadcast channel.

2. A video signal recorder/player device as claimed in claim 1, characterized in that said device further comprises control means for causing the testing of the signal levels by said test means and the subsequent selection and setting of the playback channel by said selection means to be carried out only on setting up of the device at a particular territorial location.

3. A video signal recorder/player device as claimed in claim 1, characterized in that said device further comprises control means for causing the testing of the signal levels by said test means and the subsequent selection and setting of the playback channel by said selection means to be carried out periodically.

4. A video signal recorder/player device as claimed in claim 1, characterized in that said device further comprises control means for causing the testing of the signal levels by said test means and the subsequent selection and setting of the playback channel by said selection means to be carried out each time the playback channel is to be taken into use.

5. A video signal recorder/player device as claimed in any preceding claim, characterized in that said test means and selection means are implemented as a microcontroller and associated memory, a channel frequency selector, a tuner including a local oscillator, and a signal level detector, said microcontroller being programmed according to a signal level test and select algorithm which is initiated as required to cause the channel frequency selector to set the tuner to the carrier signal frequency of each of the channels to be tested, said signal level detector being operable to detect the level of the signal in the channel concerned and said microcontroller being responsive in accordance with the signal values as received by it from said signal level detector to allocate one of the tested channels as the playback channel.

6. A video signal recorder/player device as claimed in claim 5, characterized in that said device is a video tape recorder/player device and that said microcontroller and associated memory, said channel frequency selector, and said tuner with the local oscillator are those already provided in said device for its normal recording-playback operations.

7. A video tape recorder/player device as claimed in claim 6, characterized in that said selection means for setting the carrier signal for the playback channel to the frequency defining the channel selected as the playback channel, is a digital-to-analog converter which, under the control of the microcontroller, sets a voltage-controlled oscillator that generates the carrier signal for the device to operate at the required frequency, said algorithm including the steps for programming the microcontroller for this control function.

8. A video tape recorder/player device as claimed in claim 5 characterized, characterised in that the signal levels in the tested channels are determined by measuring the magnitude of a control voltage which is already produced in the device as a measure of the input signal strength to provide automatic gain control of an input amplifier stage.

* * * * *